US008509148B2

(12) United States Patent
Gleixner et al.

(10) Patent No.: US 8,509,148 B2
(45) Date of Patent: Aug. 13, 2013

(54) SYSTEM AND METHOD FOR APPLICATION LAYER GATEWAY ASSISTED LOCAL IP ACCESS AT A FEMTO BASE STATION BY NETWORK ADDRESS TRANSLATION

(75) Inventors: Stephan Gleixner, Hsinchu (TW);
Jen-Shun Yang, Hsinchu (TW);
Jui-Tang Wang, Keelung (TW);
Shubhranshu Singh, Bangalore (IN);
Kuei-Li Huang, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 295 days.

(21) Appl. No.: 12/980,539

(22) Filed: Dec. 29, 2010

(65) Prior Publication Data

US 2012/0170512 A1 Jul. 5, 2012

(51) Int. Cl.
*H04W 40/02* (2009.01)
(52) U.S. Cl.
USPC ........................................................ 370/328
(58) Field of Classification Search
USPC ................. 370/328, 466, 254, 356, 312–313, 370/338, 349, 395.54, 399
See application file for complete search history.

(56) References Cited

U.S. PATENT DOCUMENTS

| 2004/0246991 | A1* | 12/2004 | Tsuzuki et al. | 370/466 |
| 2009/0028138 | A1* | 1/2009 | Lim | 370/356 |
| 2009/0268668 | A1* | 10/2009 | Tinnakornsrisuphap et al. | 370/328 |
| 2010/0272088 | A1* | 10/2010 | Buckley | 370/338 |
| 2010/0329225 | A1* | 12/2010 | Balasubramanian | 370/338 |
| 2011/0103266 | A1* | 5/2011 | Andreasen et al. | 370/259 |
| 2012/0076047 | A1* | 3/2012 | Turanyi et al. | 370/254 |

FOREIGN PATENT DOCUMENTS

WO  WO-2009132139 A1  10/2009

* cited by examiner

*Primary Examiner* — Kwang B Yao
*Assistant Examiner* — Syed M Bokhari
(74) *Attorney, Agent, or Firm* — Rabin & Berdo, P.C.

(57) ABSTRACT

A method for application layer gateway (ALG) assisted local IP access (LIPA) at a base station by network address translation (NAT) allows IP capable UEs connected via HeNB or other kinds of Femto cell base station to use LIPA to establish multimedia session with other IP capable entities in the same IP network by NAT. The method relays a LIPA request to IMS, determines whether the terminating entity residing in the same IP network or not, and determines if the originating and terminating entities are allowed to use LIPA, and modifies the transport address information accordingly to facilitate signaling and packet routing. The method also provides the capability to apply different charging policies for LIPA and non-LIPA usages.

16 Claims, 17 Drawing Sheets

SYSTEM AND METHOD FOR APPLICATION LAYER GATEWAY ASSISTED LOCAL IP ACCESS AT A FEMTO BASE STATION BY NETWORK ADDRESS TRANSLATION

TECHNICAL FIELD

The disclosure generally relates to a system and method for application layer gateway (ALG) assisted local IP access (LIPA) at a base station by network address translation (NAT).

BACKGROUND

Local IP access (LIPA) provides access for IP capable user equipments (UE) connected via a Home Node B/Home eNode B (HNB/HeNB) to other IP capable entities in the same residential/enterprise IP network. With LIPA in place, an UE using LIPA can be contactable by another IP endpoint in the same residential/enterprise IP network via LIPA. Traffic for LIPA is expected not to traverse the mobile operator's network except HNB/HeNB. In this manner, resources in the mobile operator's network could be less congested and better utilized.

The 3rd-Generation Partnership Project (3GPP) defines TR 23.829 presenting several possible solutions to achieve LIPA. The L-Gateway (L-GW) based solution (solution 1, variant 1) will be very likely selected as the basis for normative specification of LIPA in 3GPP. In L-GW based solution, a local public data network (PDN) gateway is deployed in the Local Network having a connection to the mobile operator's core network. The L-GW may be collocated with a HNB/HeNB or standalone. In this technology, traffic going through the operator's core network and traffic for LIPA access use separate PDN connections. In this manner, LIPA PDN can be identified by a well-defined access point name (APN) or a specific indication independent of the APN. In terms of mobility support, the L-GW based solution where the L-GW function is collocated with the HNB/HeNB can support mobility of UEs in connected mode to another HNB/HeNB from the same local network with some limitations. The L-GW based solution where the L-GW function is standalone is expected to not have those limitations; details however are at this time for further study. Hence, the latter solution is ideally suited for enterprise deployments. However, both solutions will require some modification in the operator's core network, an L-GW needs to be deployed in the Local Network and two IP addresses will be used.

An alternative implementation of LIPA is the network address translation (NAT) based solution, also proposed and described in 3GPP TR 23.829. While the NAT-based solution (solution 2) will be very likely not selected as the normative specification, it will probably be included in the non-normative section of future standard as an alternative implementation proposal. With NAT, IP addresses are mapped from one address realm to another, providing transparent routing to end hosts. The NAT-based solution requires packet inspection, NAT and traffic mapping functionalities in HeNB.

Even though NAT-based solution will be very likely not included in the normative specification, the following identified features to make the NAT-based solution an attractive alternative: first, NAT-based is very likely to be more cost-effective than the L-GW based solution; second, NAT-based solution requires less modifications in the operator's core network and has less impact on the operator core network; third, only one IP address is used; and fourth, NAT-based solution is applicable to all UEs, including single PDN capability UEs. However, the mobility cannot be supported easily for the NAT-based solution. Hence, the NAT-based solution is mostly attractive to applications where cost effectiveness, instead of mobility, is the first priority concern, such as, residential deployments.

One U.S. Patent document disclosed a local IP access scheme, wherein different interfaces are used for accessing different services in some implementation, an access point (e.g., Femto node) proxy provides a proxy function, such as a proxy address resolution protocol (ARP) function, for an access terminal in some implementation, an access point proxy provides an agent function, such as a Dynamic Host Configuration Protocol (DHCP) function, in some implementation, and an access point may determine whether to send a packet from an access terminal via a protocol tunnel based on the destination of the packet in some aspects. In addition, NAT operations may be performed at an access point to enable the access terminal to access local service, where one IP interface and one public IP address is assigned to the access terminal. The disclosed prior art also claims that a NAT comprising substituting a network IP source address assigned to the access terminal for an operator network with a local IP source address assigned to the access terminal for the Local Network.

On the other hand, an application layer gateway (ALG) is an application specific translation agent that allows an application on a host in one address realm to connect to a counterpart running on a host in different realm transparently. To support address and port translation for certain application layer protocols, such as, Session Initiation Protocol (SIP), ALG conducts deep packet-inspection of all packets. An ALG understands the protocol used by the specific applications that the ALG supports.

Additional related concepts in mobile communication technology are given below to lay ground for later discussion. For example, SIP is a signaling protocol used for establishing sessions in an IP network. A session could be a simple two-way telephone call or a collaborative multimedia conference session. SIP is based on the request-response paradigm. SIP defines the following methods—INVITE, ACK, BYE, CANCEL, OPTIONS, REGISTER, and INFO. Various SIP responses can be defined, for instance, 1xx response category is informational, 2xx response category implies successful, 3xx response category is for redirection, 4xx response category is for request failure, 5xx response category is for server failure, and 6xx response category is for global failure.

The IP multimedia subsystem (IMS) is an architecture framework for delivering IP multimedia services. It was originally defined by the wireless standard body 3GPP, as a part of the vision for evolving mobile networks beyond GSM.

With respect to SIP and ALG, the aforementioned U.S. Patent document does not consider SIP and SIG ALG to facilitate LIPA implementation. FIG. 1 shows an exemplary schematic view of the system described in the aforementioned U.S. patent document extended by a SIP Server to enable the establishment of a SIP session within the local network. FIG. 1 also shows schematically the SIP signaling and RTP/RTCP paths. FIG. 2 shows an exemplary schematic view of the SIP messages signaling flow used in SIP signaling process and the RTP/RTCP traffics. As shown in FIG. 2, an INVITE message from UE A is relayed by SIP server to UE B, and an OK message from UE B is also relayed by SIP server to UE A. After an ACK (acknowledgement) is sent from UEA to UE B, the SIP signaling process is complete.

FIG. 3 shows a schematic view of details of the NAT for an exemplary embodiment of FIG. 1. As shown in FIG. 3, the exemplary NAT substitutes a source IP address assigned by an operator in an IP packet with a source IP address assigned by the Local Network in case of LIPA.

SUMMARY

The exemplary embodiments of the present disclosure may provide a NAT-based solution for LIPA implementation, which is applicable to an environment having an IP multimedia subsystem (IMS), an originating entity, a terminating entity, and a local network having an application server and a HNB/HeNB.

An exemplary embodiment of the disclosure relates to a method for application layer gateway (ALG) assisted local IP access (LIPA) at a base station by network address translation (NAT). The method comprises: relaying the request for using LIPA to the IMS using SIP and a SIP ALG, and the IMS identifying that request as a request from the originating entity for using LIPA, and to determine whether the originating entity is allowed to use LIPA, and if not stopping the method; when the terminating entity is in same local network as the originating entity, the IMS relaying that information to the ALG, and the ALG changing transport address information (TAI) in the request response and TAI in an ACK message to a local TAI; in case of a handover situation, the ALG changing the TAI from the local TAI back to an original TAI; and the IMS informing the originating entity that the terminating entity is not in the same local network and regular charging will apply or notifying the originating entity to determine whether to proceed with a call setup in this situation.

Another exemplary embodiment of the present disclosure relates to a system for application layer gateway (ALG) assisted local IP access (LIPA) at a base station by network address translation (NAT). The system comprises an ALG embedded in the application server and a NAT/Router/DHCP-Client module embedded in the HNB/HeNB. ALG is responsible for changing transport address information in at least a signaling message and at least a packet when necessary. The NAT/Router/DHCP-Client module is used for executing routing decision. Wherein, when the terminating entity is in same local network as the originating entity, the IMS relays information of the originating and terminating entities residing in said same local network to the ALG, and the ALG changes transport TAI in a request from the originating entity for using LIPA and TAI in an ACK message to a local TAI, and when in case of a handover situation, the ALG changes the TAI from the local TAI back to an original TAI.

The foregoing and other features, aspects and advantages of the disclosure will become better understood from a careful reading of a detailed description provided herein below with appropriate reference to the accompanying drawings.

DETAILED DESCRIPTION OF THE EXEMPLARY EMBODIMENTS

As mentioned above, network address translation (NAT) based solution is very likely more cost efficient than the L-GW based solution, has less impact on the operator core network, and is applicable to all UEs including single PDN capability UEs. Therefore, the exemplary embodiments may provide a system and method to allow Local IP Access (LIPA) for IP capable UEs connected via Home eNode B (HeNB) or other kinds of Femto Cell Base Stations to other IP capable entities in the same IP network by NAT. The exemplary embodiments may include relaying a LIPA request to IMS, determining whether the terminating IP capable entity resides in the same IP network or not, determining if the originating and termination entities are allowed to use LIPA, modifying the transport address information, and such allowing or disallowing Local IP Access, based on subscription status and operator policies, and the capability to apply different charging policies for Local IP Access and Non-Local IP Access.

Figure 1:
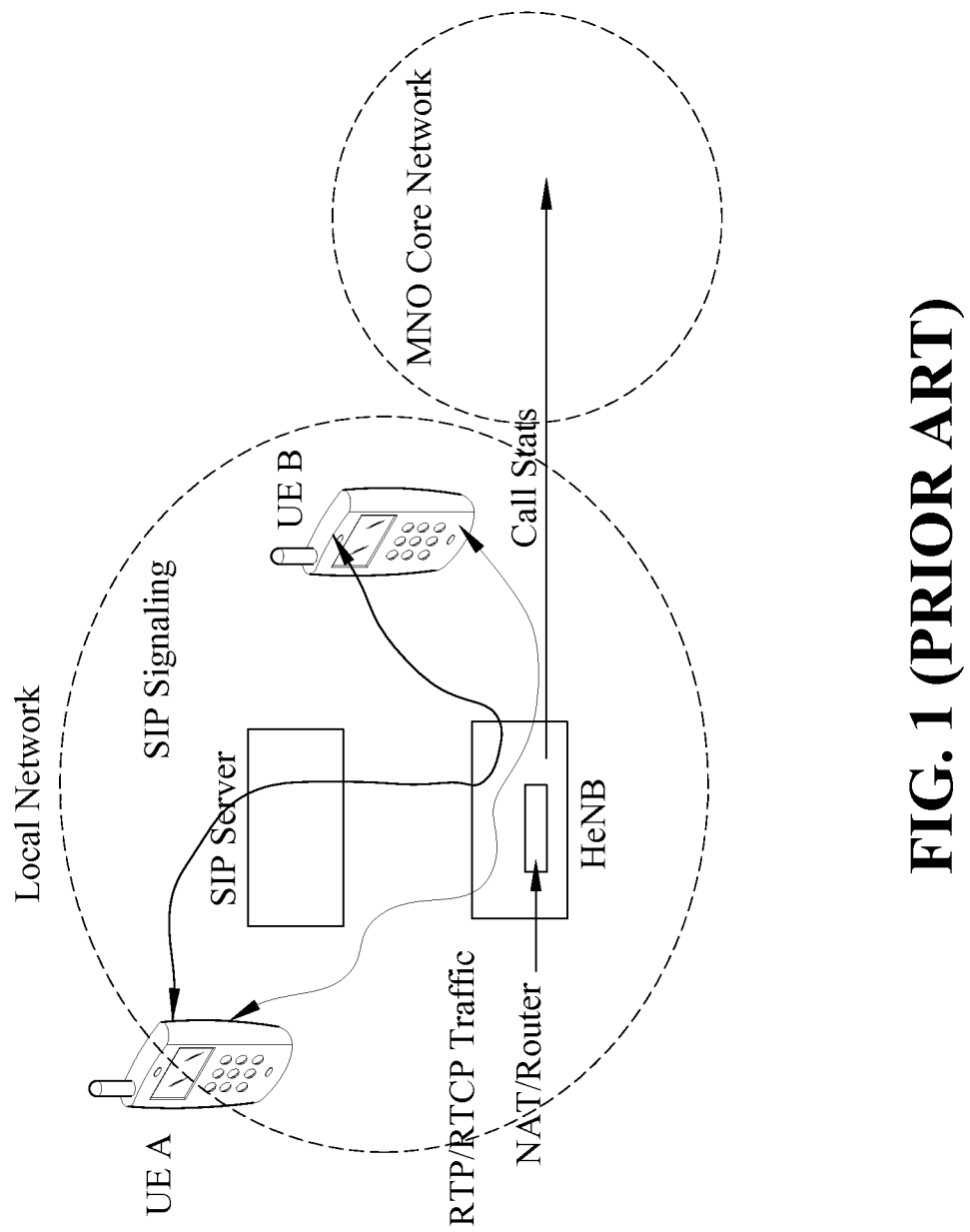
FIG. 1 shows an exemplary schematic view of the system and the SIP signaling and RTP/RTCP paths in conventional techniques.
Figure 2:
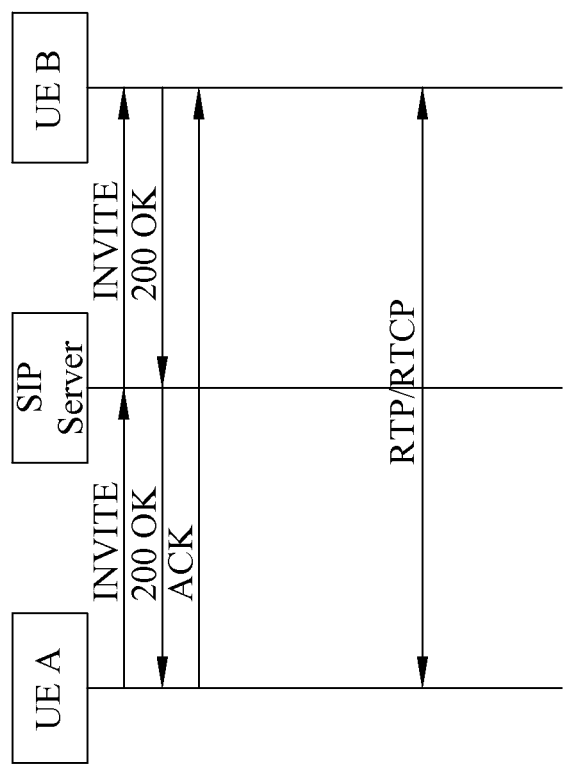
FIG. 2 shows a schematic view of the SIP messages signaling flow of an exemplary embodiment of messages used in SIP signaling process and the RTP/RTCP traffics in conventional techniques.
Figure 4:
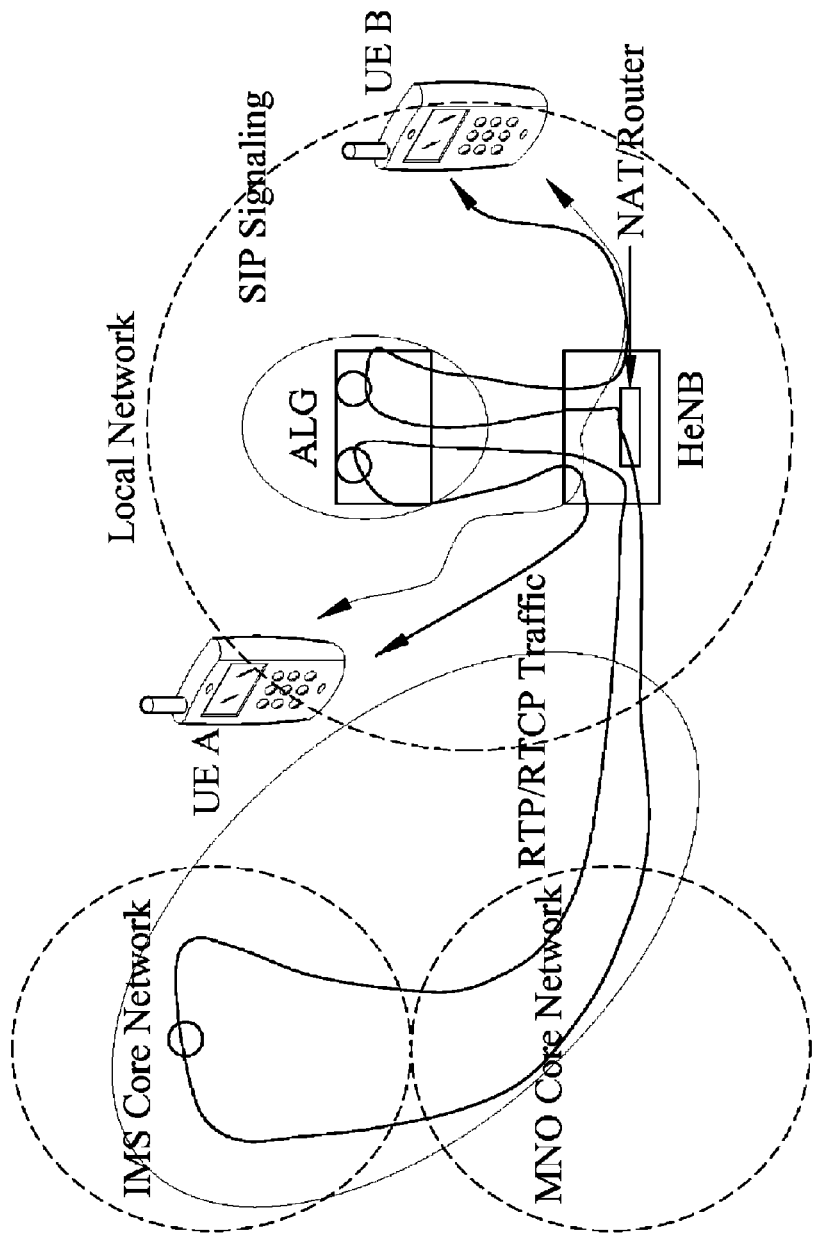
FIG. 4 shows a schematic view of the SIP signaling process for a system for application layer gateway (ALG) assisted local IP access (LIPA) at a Femto base station via network address translation (NAT), consistent with certain disclosed embodiments.
Figure 5:
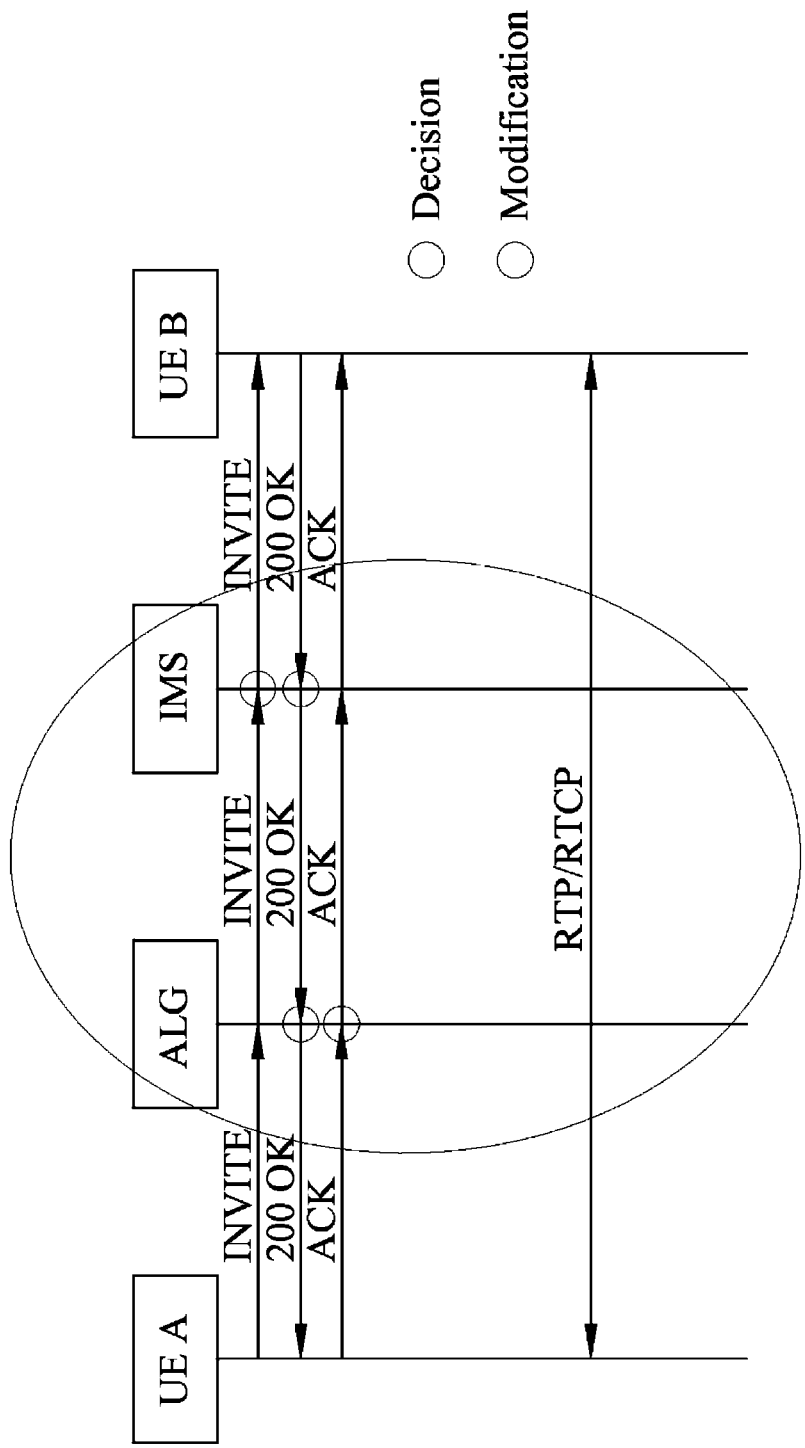
FIG. 5 shows an exemplary schematic view of the SIP messages signaling flow of the SIP signaling of FIG. 4, consistent with certain disclosed embodiments.

FIG. 4 shows an exemplary schematic view of the SIP signaling process in a system for application layer gateway (ALG) assisted local IP access (LIPA) at a Femto base station via NAT, and FIG. 5 shows an exemplary schematic view of the SIP messages signaling flow of the SIP signaling of FIG. 4, consistent with certain disclosed embodiments. Referring to FIG. 4 and FIG. 5, the SIP signaling messages will be modified by ALG, and be checked by IMS to determine for selecting an appropriate action. Thus, both INVITE message and responses to INVITE message must be checked by IMS before relaying to and from UE B, and the INVITE responses and ACK messages to and from UE A must also be modified by ALG before relaying to UE A or IMS. Unlike the conventional technique shown in FIG. 1 and FIG. 2, the SIP server only relays the SIP messages between UE A and UE B.

Figure 3:
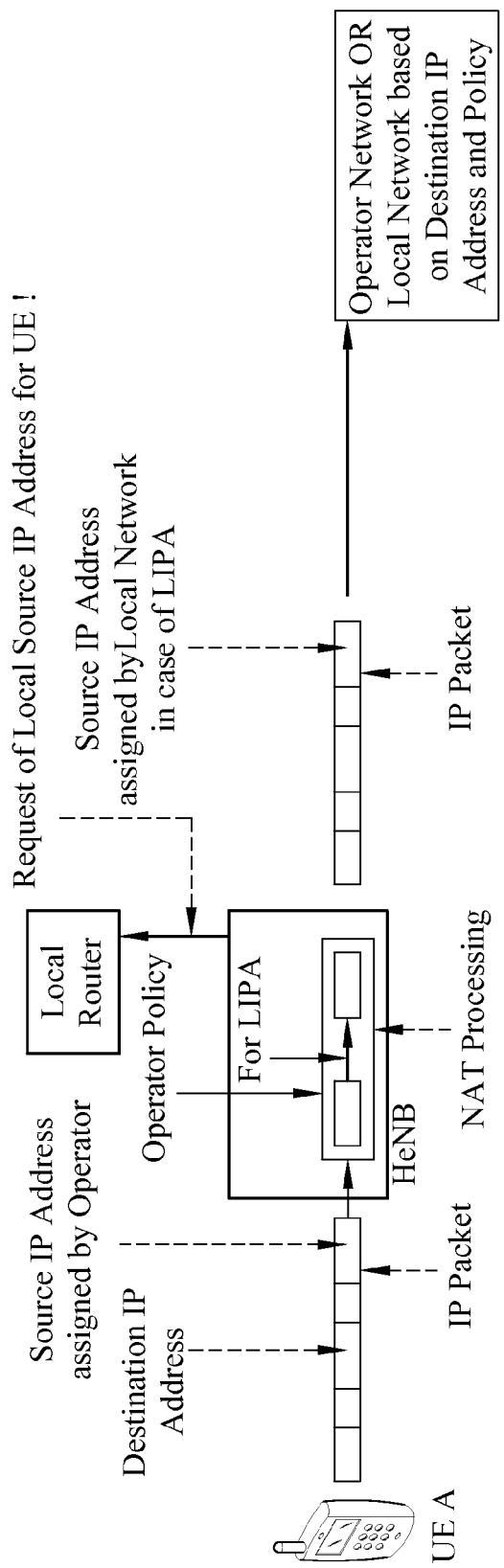
FIG. 3 shows a schematic view of details of the NAT for an exemplary embodiment of FIG. 1.
Figure 6:
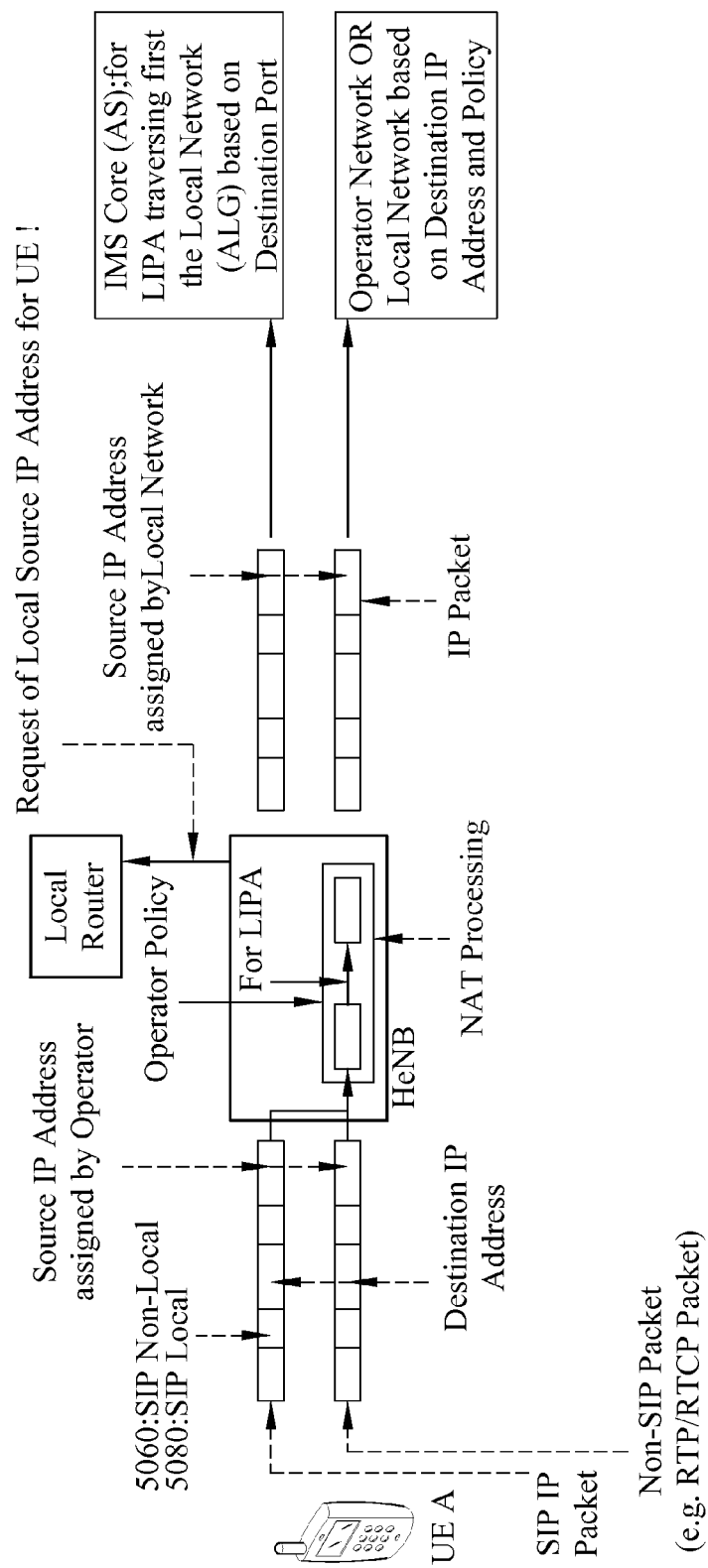
FIG. 6 shows an exemplary schematic view of the details of the modification made by the ALG on the transport address information in the SIP messages from the NAT processing perspective, consistent with certain disclosed embodiments.

Similarly, FIG. 6 shows an exemplary schematic view of the details of the modification made by the ALG on the transport address information in the SIP messages from the NAT processing perspective, consistent with certain disclosed embodiments. Referring to FIG. 6, both SIP packet and non-SIP packet (for example, RTP/RTCP packet) are processed with proper changes made to the source IP address, compared to the exemplar of the conventional technique shown in FIG. 3.

Figure 7:
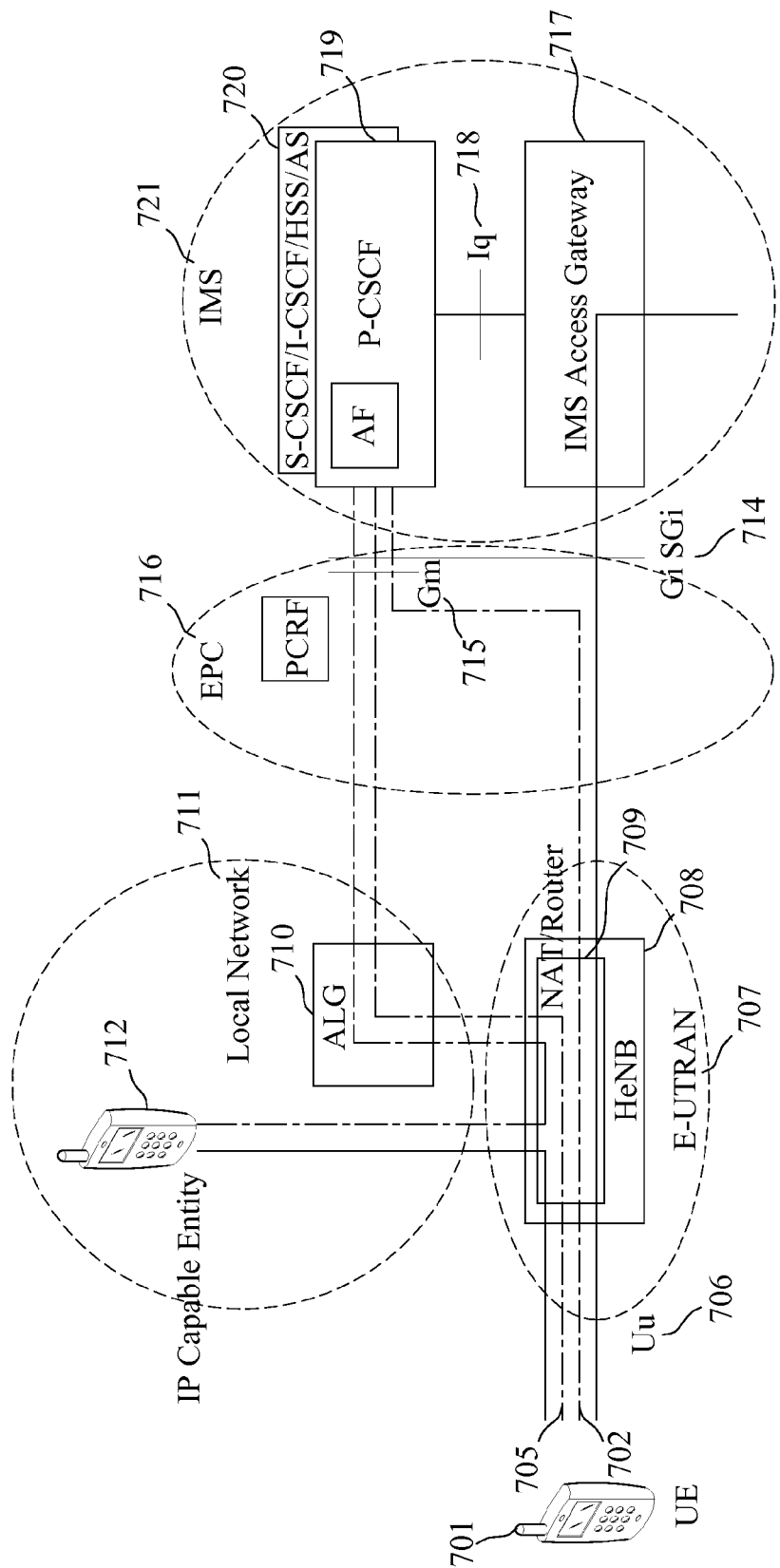
FIG. 7 shows an exemplary schematic view of an exemplary embodiment of a system for ALG assisted LIPA at a Femto cell base station by NAT, consistent with certain disclosed embodiments.

FIG. 7 shows an exemplary schematic view of an exemplary embodiment of a system for ALG assisted LIPA at a Femto cell base station by NAT, consistent with certain disclosed embodiments. Referring to FIG. 7, the system may be applicable to an environment having an IP multimedia subsystem (IMS) 721, an originating entity user equipment (UE) 701, a terminating entity user equipment, and a local network 711 having an application server (not shown) and an HeNB 708. FIG. 7 is similar to FIG. 4, with the additional details of the Enhanced packet Core (EPC) 716 and IMS 721 for description of the operation in context. As shown in FIG. 7, the system may comprise an application layer gateway (ALG) 710 embedded in the application server, and a NAT/Router/DHCP-Client module 709 embedded in the HeNB 708. Application layer gateway (ALG) 710 may be responsible for changing transport address information in the signaling messages and packets when necessary. NAT/Router/DHCP-Client module 709 may be used for executing routing decision.

Referring to FIG. 7, an UE 701 is using UMTS Enhanced-Terrestrial Radio Access Network (E-UTRAN) 707 having the HeNB 708. UE 701 is assigned an IP address by EPC 716 and is registered to EPC 716 and IMS 721.

It should be understood that the hereafter disclosed embodiments are only for illustration, instead of restriction. Various other kinds of radio access networks are also applicable. For example, the UMTS E-UTRAN may be replaced by an IEEE 802.16 Worldwide Interoperability for Microwave Access (WiMAX) network, and the same principle of the disclosed embodiments is still applicable.

The following description uses SIP to set up a multimedia communication session between UE 701 and an IP capable entity 712, with traversing IMS 721 as an exemplar to explain the operation of the system. However, the description is also applicable to other signaling protocols. It is also worth noting that Uu 706, Gi/SGi 714, Gm 715 and Iq 718 are reference points as defined and described in 3GPP TS23.002.

When UE 701 intends to establish a SIP session, the uplink data is available in the form of a SIP signaling message, and more specifically, a SIP INVITE Request, and therefore, a 3GPP Service Request procedure is triggered. The 3GPP Service Request may be for Local IP Access (LIPA) or Non-Local IP Access (non-LIPA). In the case of LIPA, the SIP INVITE Request, depicted as a dashed line 705, traverses an ALG 710, such as SIP ALG in the case, residing in the Local Network 711. ALG 710 may perform specific modifications in the SIP INVITE Request. In the case of non-LIPA, the SIP INVITE Request, depicted as a dashed line 702, is sent directly to EPC 716 without traversing SIP ALG 710. In both cases, the SIP INVITE Request is destined for IMS 721, in particular, SIP Application Server (AS) 720 of IMS 721. P-CSCF 719 is the entry point to the IMS domain.

SIP AS 720 is capable to determine, based on specifics of the SIP INVITE Request whether the session establishment request is for LIPA or Non-LIPA. Those specifics may be modifications in the SIP INVITE Request performed by the ALG 710 or a dedicated IP port, such as port 5080 for LIPA traffic and port 5060 for Non-LIPA traffic. In the case of LIPA, SIP AS 720 may check with the Home Subscriber Server (HSS) through Reference Point Sh (not shown) to see whether UE 701 is allowed to use LIPA. If not, SIP AS 720 may abort the session establishment request by initiating, for example, a SIP 403. If UE 701 is allowed to use LIPA, IMS 721 locates the destination domain of terminating IP Capable Entity 712 and forwards the INVITE Request to destination EPC 716 traversing P-CSCF (not necessarily the same P-CSCF that was traversed before by the signaling message from originating UE 701 to IMS 721.) EPC 716 then triggers the Paging procedure to locate the destination IP Capable Entity 712.

When destination IP Capable Entity 712 has been located, IP Capable Entity 712 initiates a service request procedure. After a bearer has been established, the SIP INVITE Request can be forwarded from EPC 716 to terminating IP Capable Entity 712. The SIP User Agent (not shown) in IP Capable Entity 712 is capable to determine, based on specifics of the SIP INVITE Request if the session establishment request is for LIPA traffic or Non-LIPA traffic. Those specifics may be modifications in the SIP INVITE Request performed by the ALG 710 or a dedicated IP port, such as port 5080 for LIPA and port 5060 for Non-LIPA. If the SIP session establishment request is for LIPA, terminating IP Capable Entity 12 responds with, for example, a 200 OK.

Figure 8:
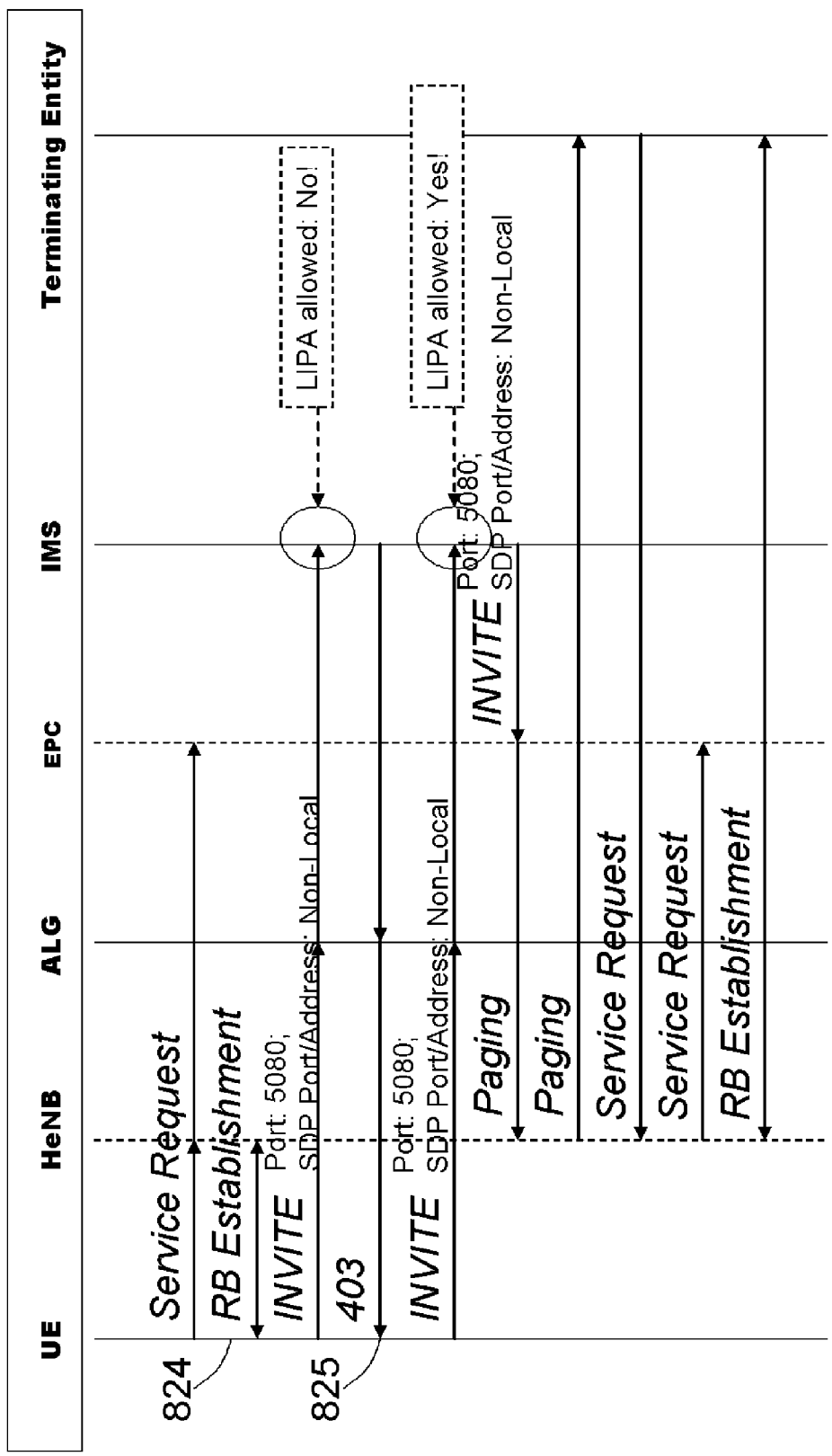
FIG. 8 shows an exemplary schematic view illustrating the flow from an UE starting a 3GPP UE triggered Service Request procedure and signaling the intention to establish a SIP session, up to an INVITE Request is either rejected by the IMS or forwarded to the terminating entity, starting a 3GPP Network triggered Service Request procedure consistent with certain disclosed embodiments.
Figure 9A:
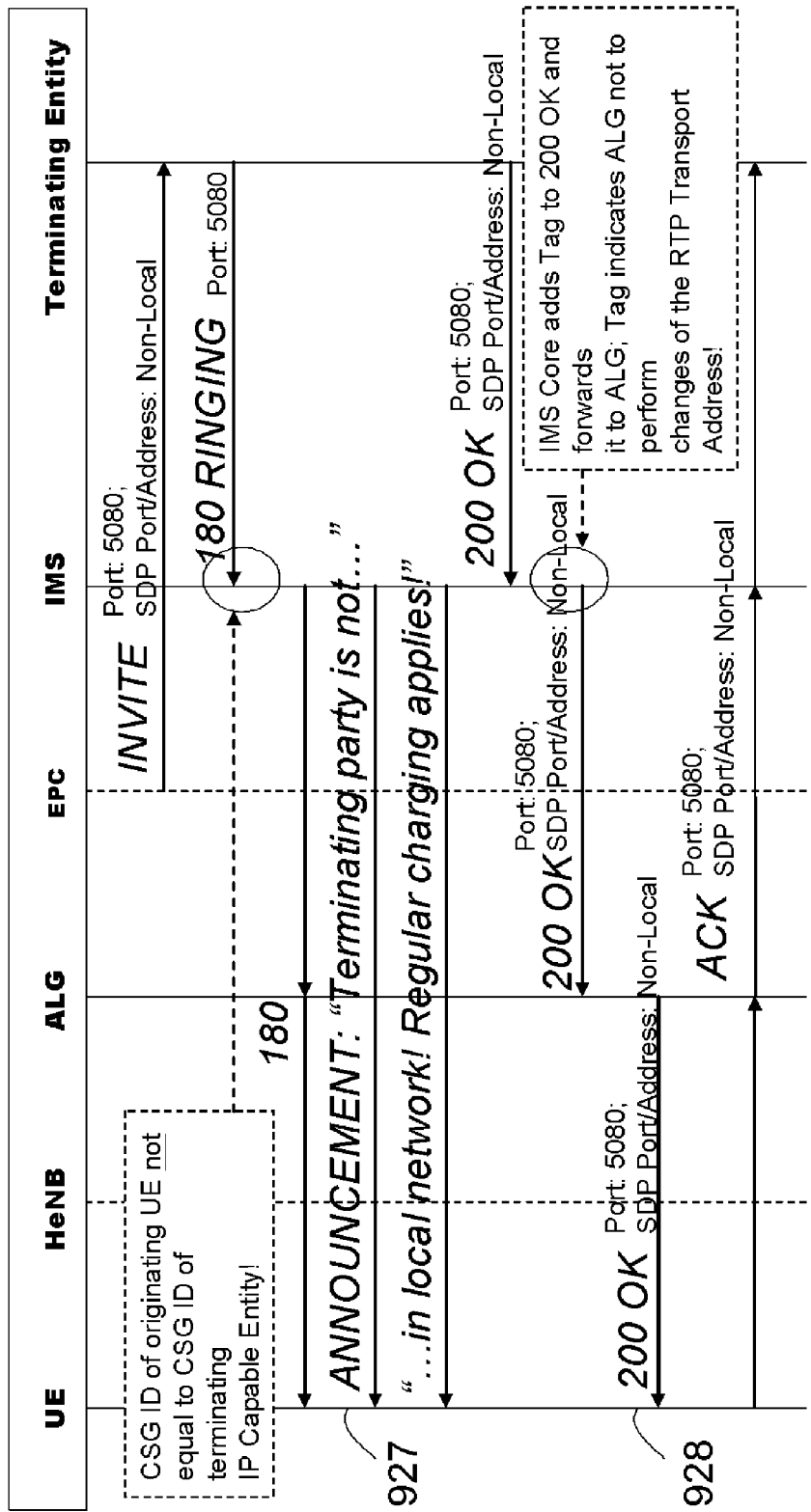
FIGS. 9A-9C show an exemplary schematic view illustrating the scenario when CSG ID of the originating entity is not equal to the CSG ID of the terminating entity, consistent with certain disclosed embodiments.
Figure 9B:
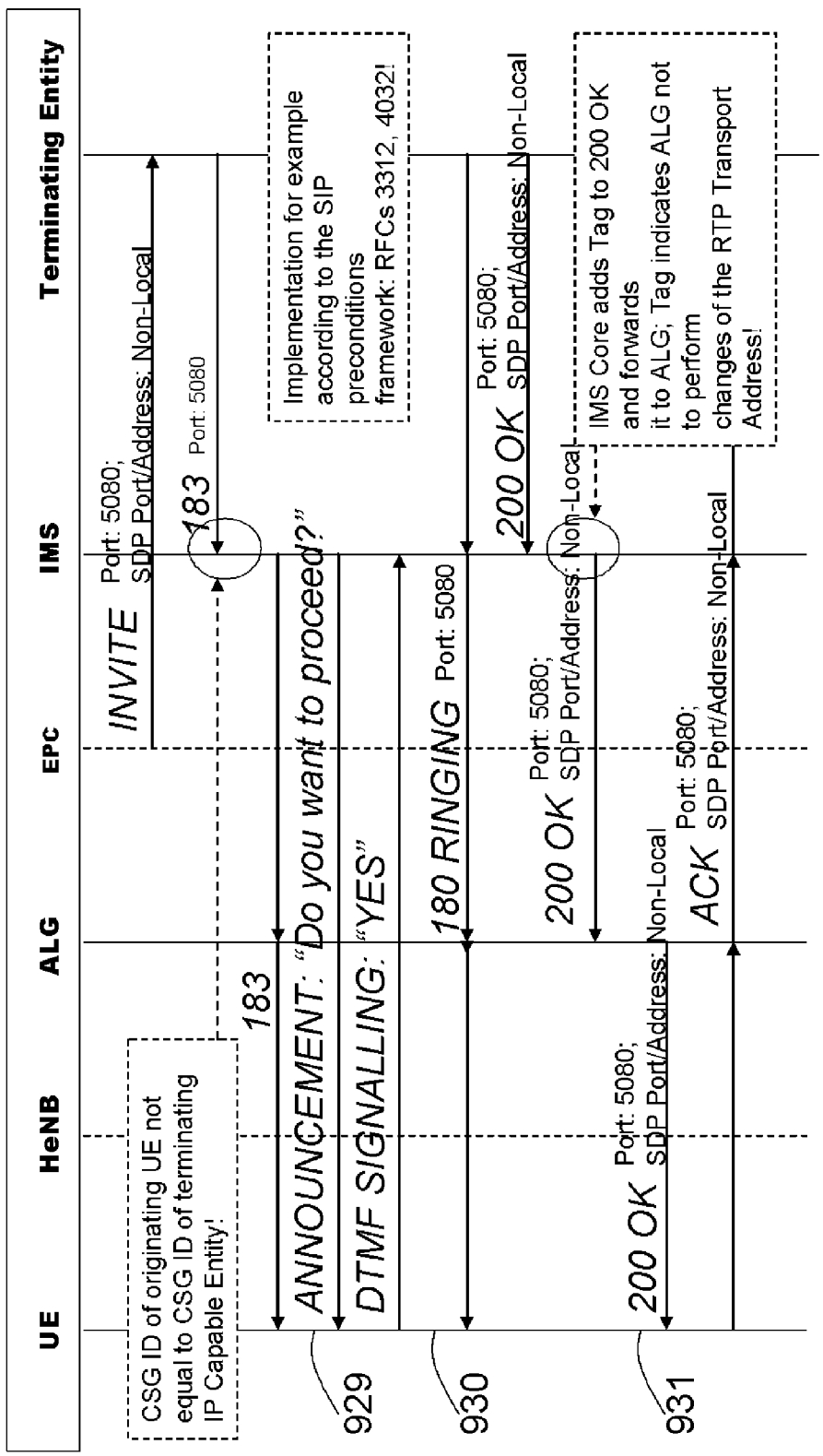
Figure 9C:
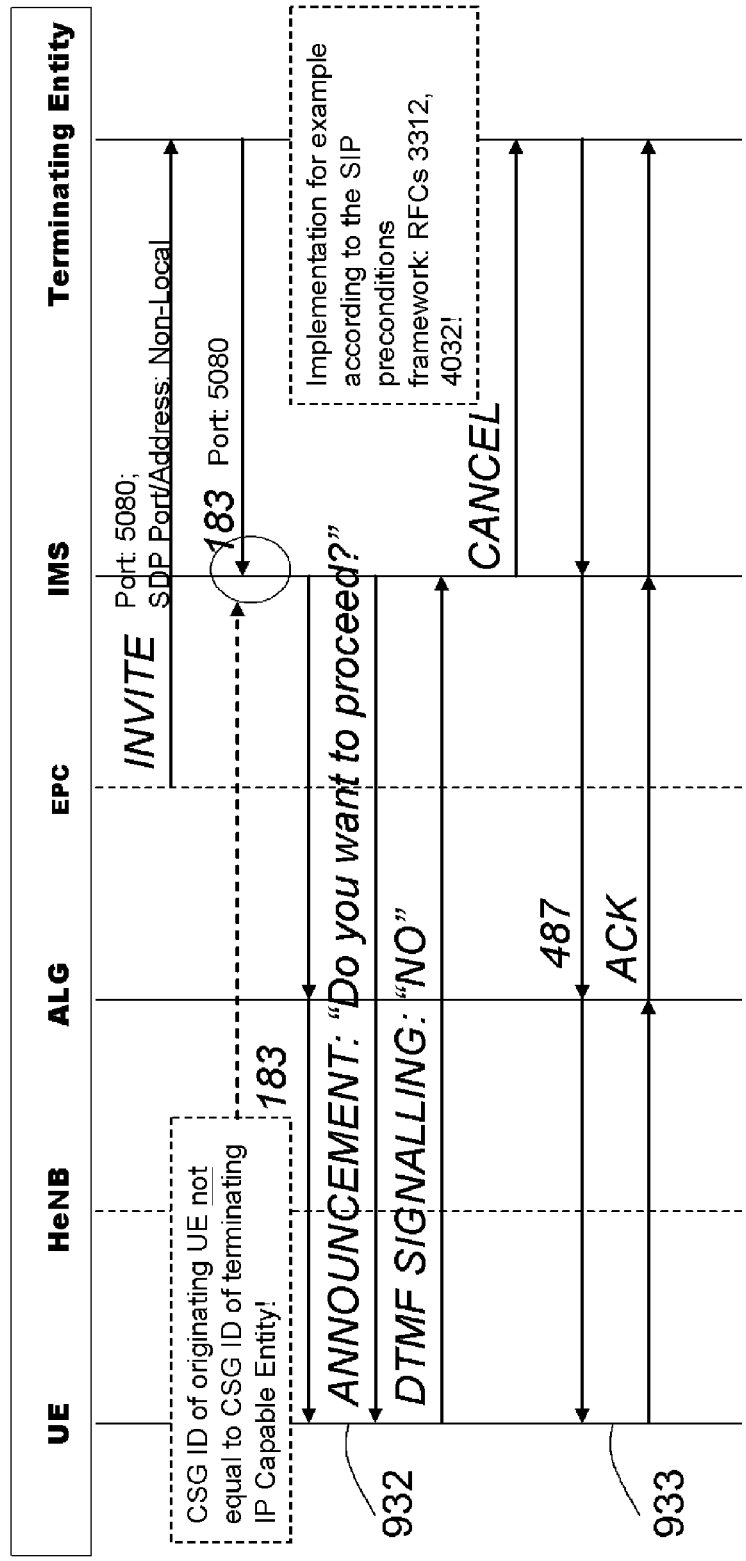
Figure 10:
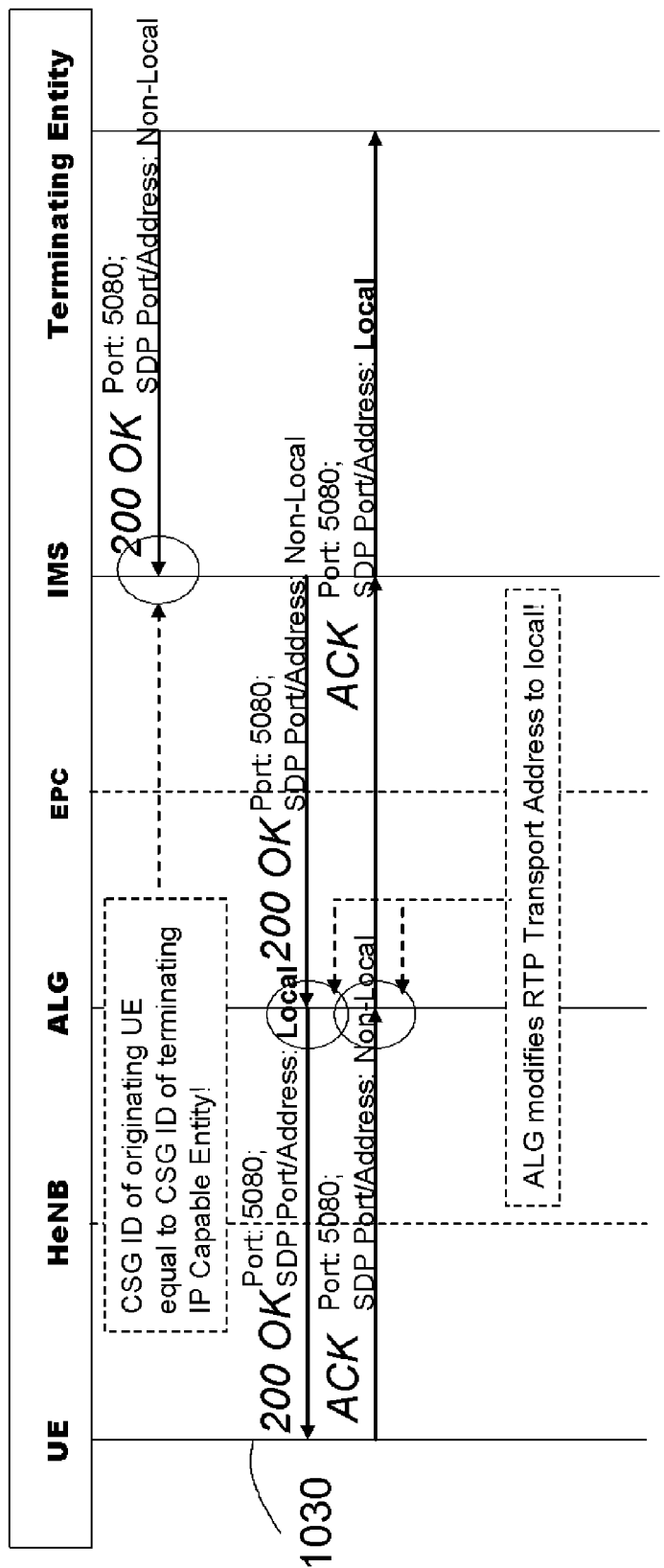
FIG. 10 shows an exemplary schematic view illustrating the scenario when CSG ID of the originating entity is equal to the CSG ID of the terminating entity, consistent with certain disclosed embodiments.
Figure 11:
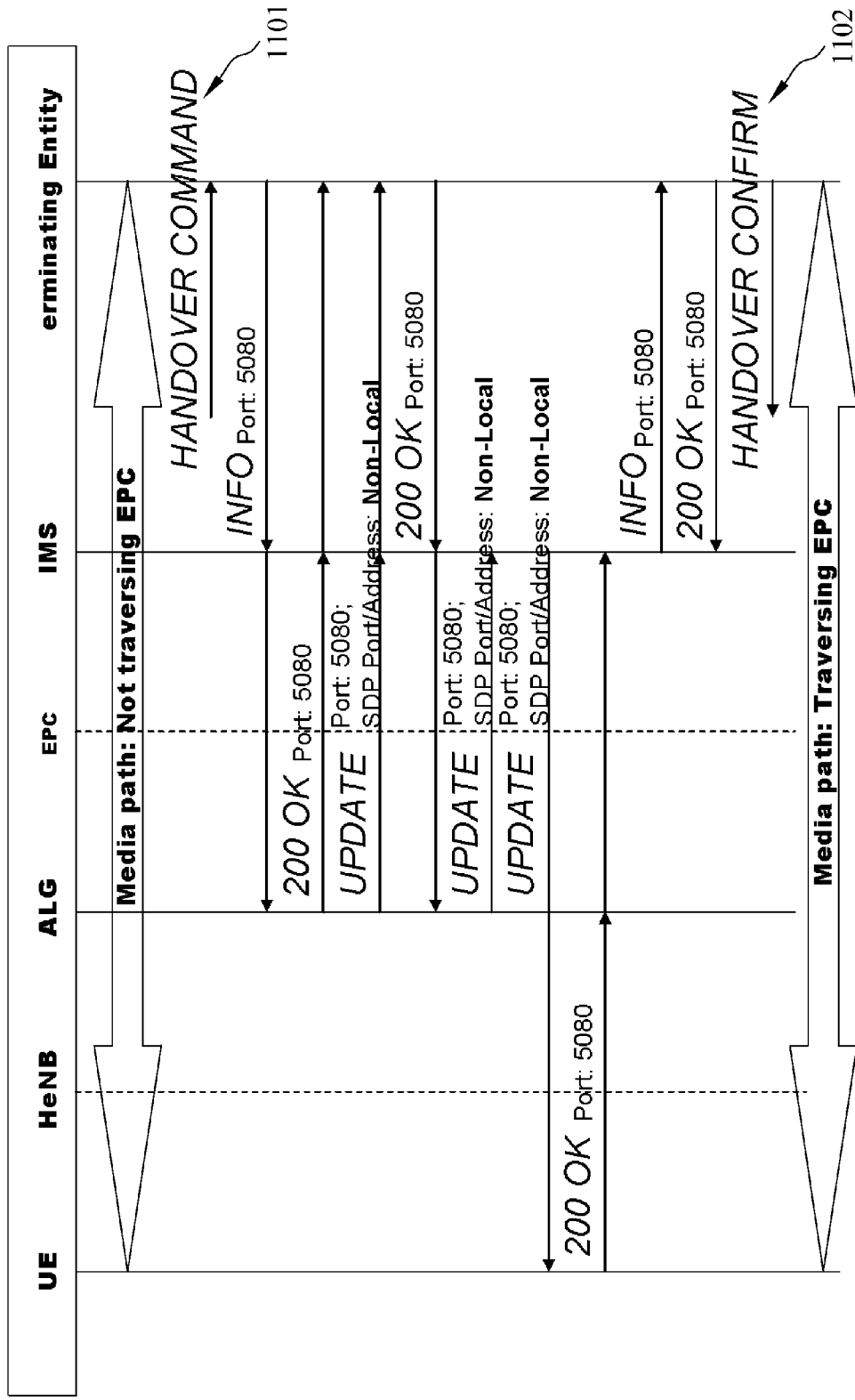
FIG. 11 shows an exemplary schematic view illustrating the scenario when the terminating entity moves to another cell (within or outside of the local network) during an active call with another party in the local network and such a handover takes place.

FIGS. 8-11 show the previously outlined procedure, as well as the exemplar of FIG. 6, in more details. FIG. 8 shows an exemplary schematic view illustrating the flow from an UE signaling the intention to establish a SIP session, up to an INVITE Request is either rejected by the IMS or forwarded to the terminating entity, consistent with certain disclosed embodiments. FIGS. 9A-9C show an exemplary schematic view illustrating the scenario when CSG ID of the originating entity is not equal to the CSG ID of the terminating entity, consistent with certain disclosed embodiments. FIG. 10 shows an exemplary schematic view illustrating the scenario when CSG ID of the originating entity is equal to the CSG ID of the terminating entity, consistent with certain disclosed embodiments. FIG. 11 shows an exemplary schematic view illustrating a handover scenario when the terminating entity involved in a call with an originating entity in the same local network moves out of the local network.

As shown in FIG. 8, an UE intending to establish a SIP session (denoted as originating entity below) has uplink data available in form of a SIP INVITE message. The UE, therefore, triggers a 3GPP Service Request procedure, including setting up a Radio Bearer, marked as 824 of FIG. 8.

Assuming that the originating entity UE intends to use LIPA, the UE will send the SIP INVITE message to ALG 710 residing in the same Local Network as the UE. The UE may use a special IP Port for LIPA, such as port 5080. The ALG 710 performs necessary modifications in the SIP INVITE message and forwards the SIP message to the terminating entity, traversing the HeNB that the originating entity is attached to, EPC, IMS, and finally the HeNB that the terminating entity is attached to. The IMS is able to determine, based on modification of the SIP INVITE message performed in the ALG or the special IP Port used for LIPA, such as 5080, to indicate that the UE wishes to use LIPA.

The IMS, in particular, a SIP AS of the IMS, may check with the HSS through Reference Point Sh if the UE is allowed to use LIPA. If not, the AS may abort the session establishment request by issuing, for example, a SIP 403, to ALG, and ALG relays the SIP 403 to the UE. On the other hand, if the UE is allowed to use LIPA, IMS locates the destination domain of the terminating entity and forwards the SIP INVITE Request to the terminating EPC, and the EPC triggers a Paging procedure. Upon receiving the Paging indication in E-UTRAN access, the terminating entity initiates the UE triggered Service Request procedure, including setting up a Radio Bearer. At this point, the SIP INVITE Request may be forwarded to the terminating entity, marked as 825 of FIG. 8.

FIGS. 9A-9C show an exemplary schematic view illustrating the scenarios when CSG ID of the originating entity is not equal to the CSG ID of the terminating entity, consistent with certain disclosed embodiments. As shown in FIG. 9A, the terminating entity may respond with a 180, sent to IMS. IMS checks whether the Closed Subscriber Group Identity (CSG ID) of the UE is equal to the CSG ID of the terminating entity. If not, IMS concludes that UE and terminating entity are not in the same Local IP Network, according to the underlying assumption that entities in the same Local IP Network are part of the same closed subscriber group. Depending on operator's policy, the IMS could now apply an announcement 927 to e.g. inform the UE that the terminating entity is not in the same Local IP Network and regular charging applies. The announcement is followed by a SIP 200 OK signaling from terminating entity to IMS, IMS forwards the SIP 200 OK signaling to ALG and ALG forwards again to originating UE. The SIP 200 from terminating entity, through IMS and ALG should contain some specifics to signal the ALG to not modify the transport address information. The originating entity then sends the SIP ACK message which traverses unmodified the ALG (marked as 928). The session is established through EPC and also the related user traffic traverses the EPC. Regular (Non-LIPA) policy and charging rules are applied here for user traffic.

Alternatively, as shown in FIG. 9B, IMS and UEs may support the concept of a precondition according to RFCs 3312 and 4032. Without going into the details of this concept, it allows the terminating entity to generate an answer to an incoming request but does not alert the user. Specifically in the context of this patent, the terminating entity would send a SIP 183 to IMS without alerting the user; IMS would analyze the SIP 183 to determine if the CSG ID of the originating UE is equal or not to the CSG ID of the terminating entity. If this would be not the case as depicted in FIG. 9B, IMS could apply an announcement 929, e.g. "Do you want to proceed", to request the UE to decide whether the call establishment should be continued or not. The UE may respond with a, for example, DTMF signaling to indicate "yes" to IMS (marked as 929). The affirmative decision response would be interpreted by IMS as precondition met and IMS would indicate this to the terminating entity which could then alert the user. It should be noted that not all SIP messages between IMS and terminating entity are shown in the flow diagram. When the terminating entity alerts the user it sends a SIP 180 (ringing) followed by a SIP 200 OK when the user accepts the call to IMS, IMS forwards the SIP 180 and 200 OK signaling to ALG and ALG forwards again to originating UE (marked as 930). The originating entity then sends the SIP ACK message which traverses unmodified the ALG (marked as 931).

On the other hand, if the UE receives the above mentioned announcement and decides to not continue the call establishment, the UE may respond with a, for example, DTMF signaling to indicate "no" to IMS (marked as 932). The negative decision response would be interpreted by IMS as precondition not met and would send a CANCEL signaling to the terminating entity. Then, Terminating entity sends a SIP 487 to IMS, the SIP 487 is forwarded to ALG and finally to originating UE. The originating entity then sends the SIP ACK message which traverses unmodified the ALG (marked as 933).

As shown in FIG. 10, in the case the CSG ID of the originating entity is equal to the CSG ID of the terminating entity (marked as 1030), IMS sends the SIP 200 to the ALG which is the same ALG as the one used by the originating entity. The ALG 710 performs some modifications; specifically, the transport address information in the SDP body is modified. The originating party responds with a SIP ACK sent to the ALG. Again, the ALG performs some modifications to, in particular, the transport address information in the SDP body. In the case that the ACK does not contain a SDP body, the ALG would add a body. The session is established through EPC and the related user traffic will not traverse the EPC. Special (LIPA) policy and charging rules may be applied.

FIG. 11 shows an exemplary schematic view of a handover scenario. The terminating entity (UE2) is involved in a call with UE1. Both UEs are residing in the same local network. When UE2 moves out of the coverage of the current Femtocell and upon receipt of a HANDOVER COMMAND 1101, UE2 sends a SIP INFO to IMS and IMS forwards it to ALG. ALG responds with 200 OK and sends SIP UPDATE messages with non-local transport addresses to both UEs in order to instruct the UEs to modify the current local transport addresses to non-local ones. When IMS has received 200 OKs from both UEs, IMS sends a SIP INFO to UE2 to inform it that the transport address change has been performed. UE2 can then complete the handover procedure by sending a HANDOVER CONFIRM 1102.

Figure 12:
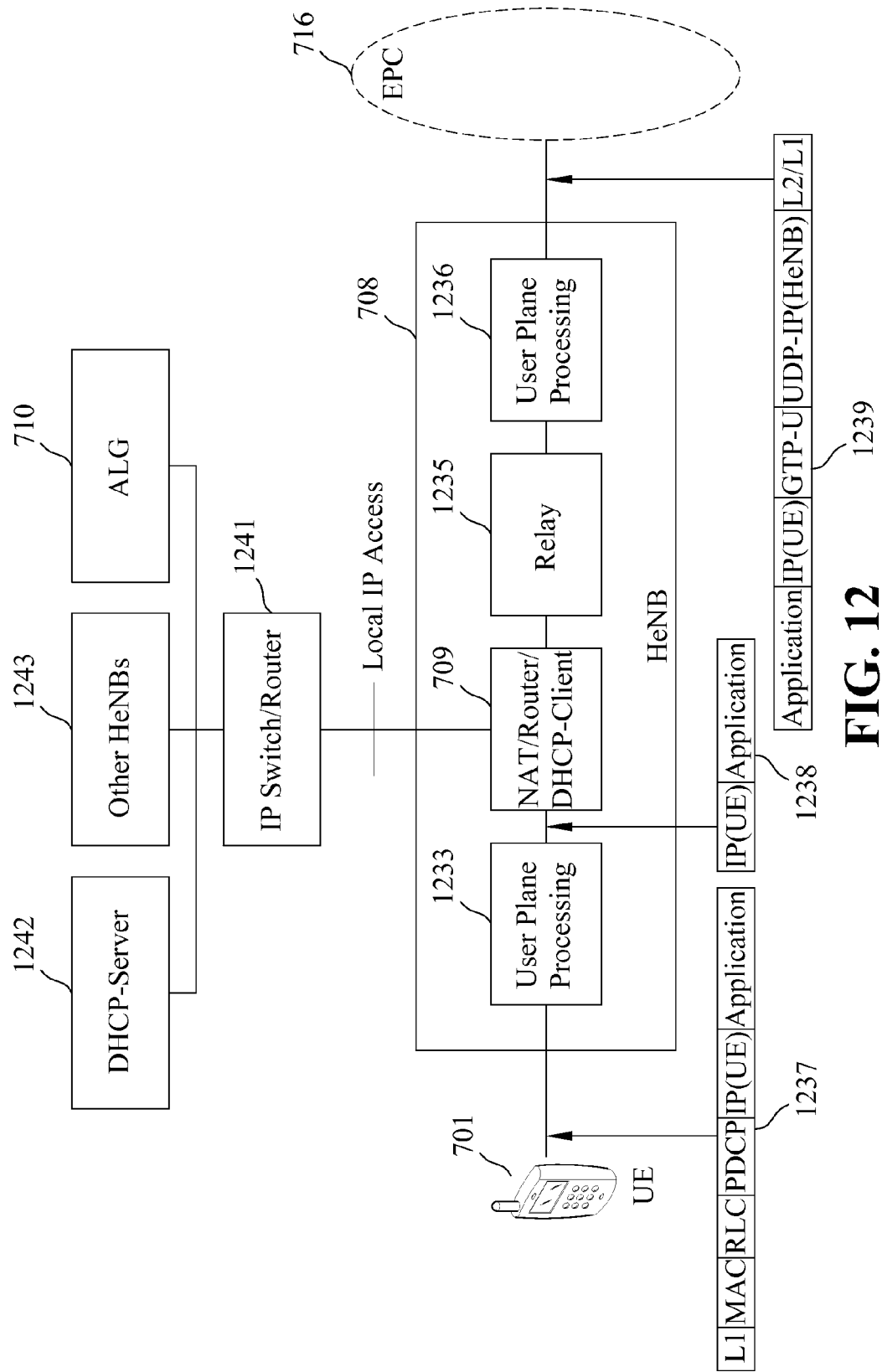
FIG. 12 shows an exemplary schematic view illustrating the additional functional entities within a HeNB, consistent with certain disclosed embodiments.

FIG. 12 shows an exemplary schematic view illustrating the additional functional entities within a HeNB, including a NAT/Router/DHCP-Client module 709, consistent with certain disclosed embodiments. As shown in FIG. 12, the environment includes a HeNB 708, enhanced packet core (EPC) 716, an IP switch/router 1241, a DHCP-server 1242, a plurality of other HeNBs 1243, and ALG 710. HeNB 708 further includes a first user plane processing 1233, NAT/Router/DHCP-Client module 709, a relay 1235 and a second user plane processing 1236. UE 701 intends to establish a LIPA connection by sending a SIP request to ALG 710 within the Local IP Network. First user plane processing 1233 of HeNB 708 processes packet 1237 to/from UE 701 and translates into packet 1238, and packet 1238 is further processed by NAT/Router/DHCP-Client module 709 as described in detail below-mentioned. The IP address of the ALG 710 may be preconfigured or entered when intending to establish the session. HeNB 708 should intercept the contents of SIP signaling messages to decipher the IP address allocated to UE 701. HeNB 708 then requests for a local IP address from a DHCP-Server 1242. Using the allocated local IP address, HeNB 708 creates a mapping between the local IP address and the EPC-allocated IP address for UE 701. HeNB 708 then inspects all data packets originating from/destined to UE 701 for the source and destination IP addresses. HeNB 708 shall modify the source/destination IP address in the packet accordingly so as to enable proper routing of the data either via the GTP tunnel to the core network or to the local router.

For example, a UE intends to establish a multimedia session to another IP capable entity and assumes that the other IP capable entity also resides in the same Local Network. The UE would then initiate a session establishment request towards the local ALG. Assume that the EPC-allocated IP address for the UE is 172.1.0.1 and the local DHCP allocated IP address is 10.0.0.1. The UE sends the SIP INVITE Request to the ALG within the local subnet (e.g. with IP address 10.0.0.2) with source IP=172.1.0.1 and destination IP=10.0.0.2. In this case, the HeNB would change the source IP address of the packet to 10.0.0.1 before forwarding the packet to the router so as to enable the router to correctly route it over the local subnet. Similarly, for an IP packet originating from 10.0.0.2 and destined for 10.0.0.1, the router would forward the packet to the HeNB, and HeNB would then change the destination IP address to 172.1.0.1 before giving the packet to the UE. For packets destined to be sent over the GTP tunnel (e.g., destination IP=214.1.6.10) or received downlink from the EPC, the HeNB would not modify the IP packets.

Routing may be also based on port numbers. For example, for SIP signaling it may be possible to select specific port number, for example, 5060 for Non-LIPA and 5080 for LIPA. For RTP and RTCP, the ports may be selected from a pool of reserved ports for LIPA and Non-LIPA, respectively, and the RTP and RTCP packets are routed accordingly, respectively.

Figure 13:
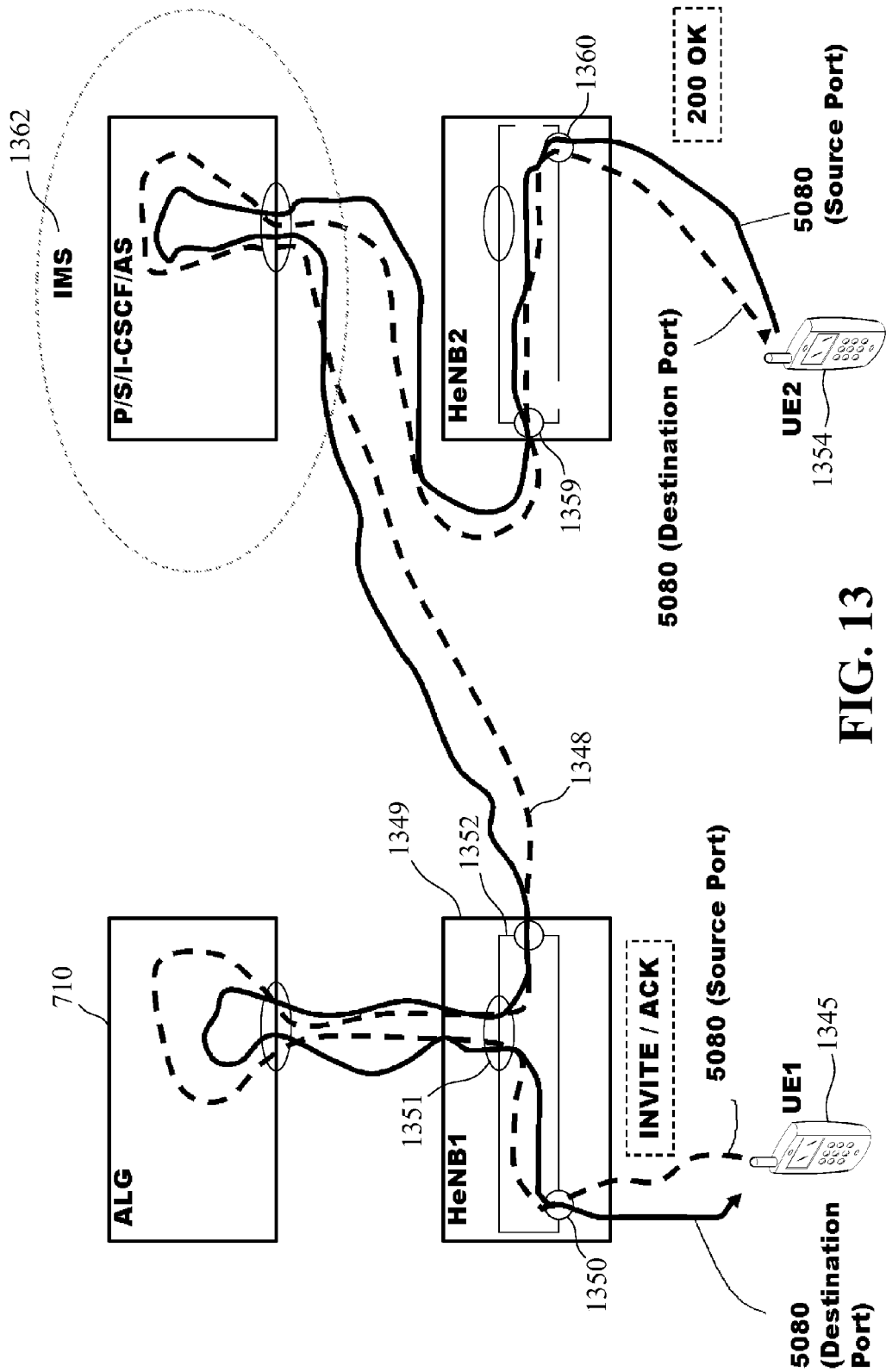
FIG. 13 shows an exemplary SIP signaling flow for the scenario of both originating entity and terminating entity residing in the same Local Network and both being allowed to use LIPA, consistent with certain disclosed embodiments.

FIG. 13 shows an exemplary SIP signaling flow for the scenario of both originating entity and terminating entity residing in the same Local Network and both being allowed to use LIPA, consistent with certain disclosed embodiments. Referring to FIG. 13, the originating entity 1345 (UE1) and the terminating entity 1354 (IP capable device (UE2) reside in the same Local Network and both entities are allowed to use LIPA. SIP INVITE message 1348 traverses router ports 1350 and 1351 to ALG 710. After required modifications, the SIP INVITE is routed back to HeNB1 and then via port 1352 to IMS 1362 and finally to UE2 1354. In case that a second HeNB2 is involved, message from IMS 1362 will traverse through ports 1359 and 1360 before reaching UE2. UE2 responds with a 200 OK using port 5080. The SIP 200 OK is traversing the same ALG 710 as the related SIP INVITE Request. ALG 710 performs necessary modifications in the 200 OK; in particular, ALG 710 modifies the transport address information to a local transport address. UE1 determines based on modifications in the 200 OK that LIPA is possible (i.e. the terminating device resides in the same Local Network and is allowed to use LIPA) and sends a SIP ACK (marked as 1348) to the ALG 710 and ALG 710 performs required modifications, specifically changes the transport address information to a local transport address.

Figure 14:
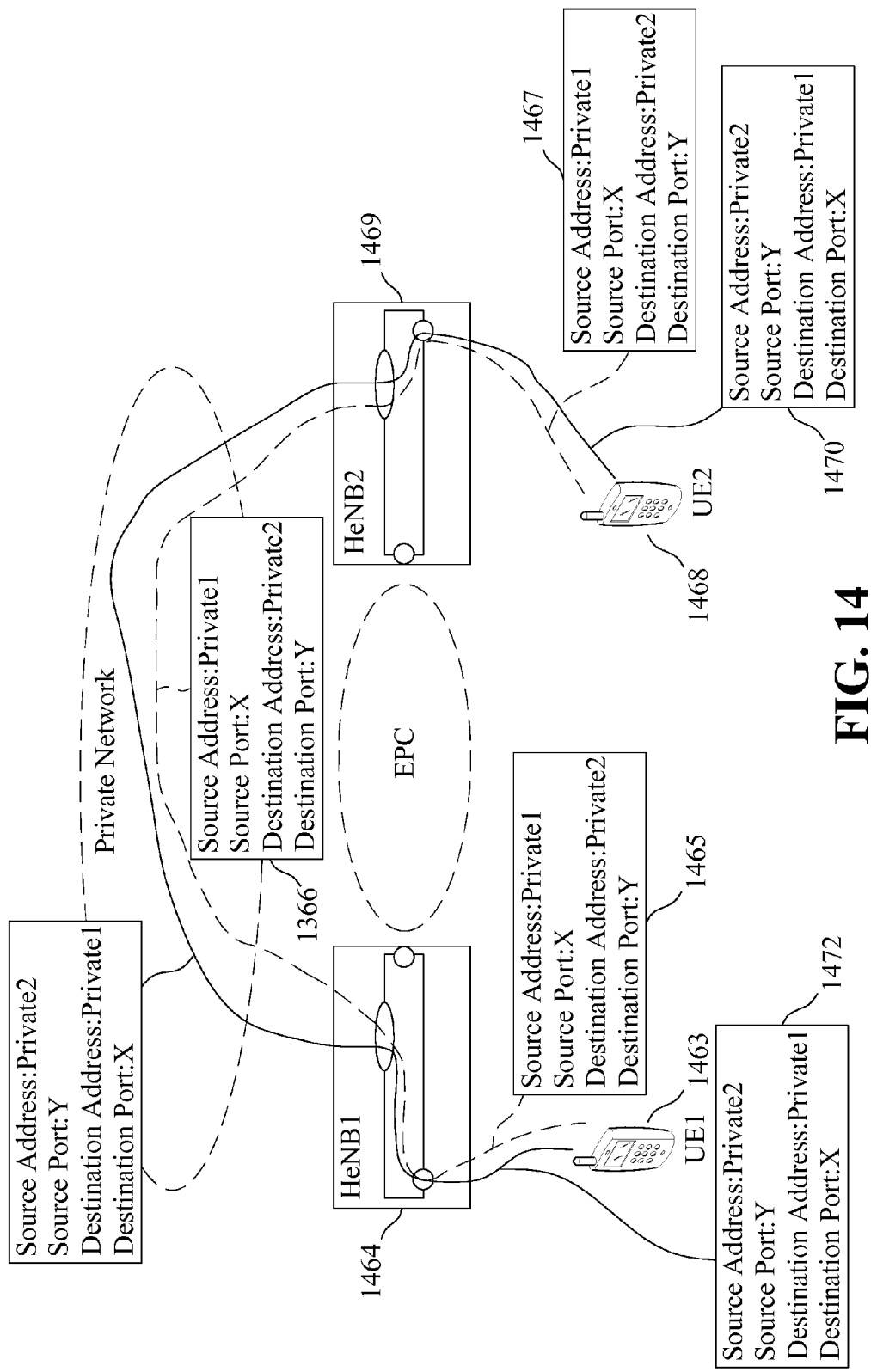
FIG. 14 shows an exemplary schematic view of the respective RTP and RTCP flows for the scenario of the originating entity and terminating entity residing in the same Local Network, consistent with certain disclosed embodiments.

FIG. 14 shows an exemplary schematic view of the respective RTP and RTCP flows for the scenario of the originating entity and terminating entity residing in the same Local Network, consistent with certain disclosed embodiments. Referring to FIG. 14, the originating entity 1463 (UE1) and the terminating entity 1468 (UE2) reside in the same Local Network having a HeNB1 (marked as 1464) and a HeNB2 (marked as 1469). Descriptive boxes marked as 1465, 1466, 1467, 1470 and 1472 explain the contents of source IP address/port number and destination IP address/port number in the packets transmitted in corresponding segments. Routing to the Local Network may be based on destination IP address or port number. In the case of using port number, a pool of port numbers is defined for LIPA and another pool is defined for Non-LIPA traffic. For example, in the case of LIPA, the ALG would assign an RTP port, such as, 10xxx. The router in HeNB 1 (marked as 1464) is aware that any port numbers 10xxx are used for LIPA and would route all packets using ports 10xxx to the Local Network.

Figure 15:
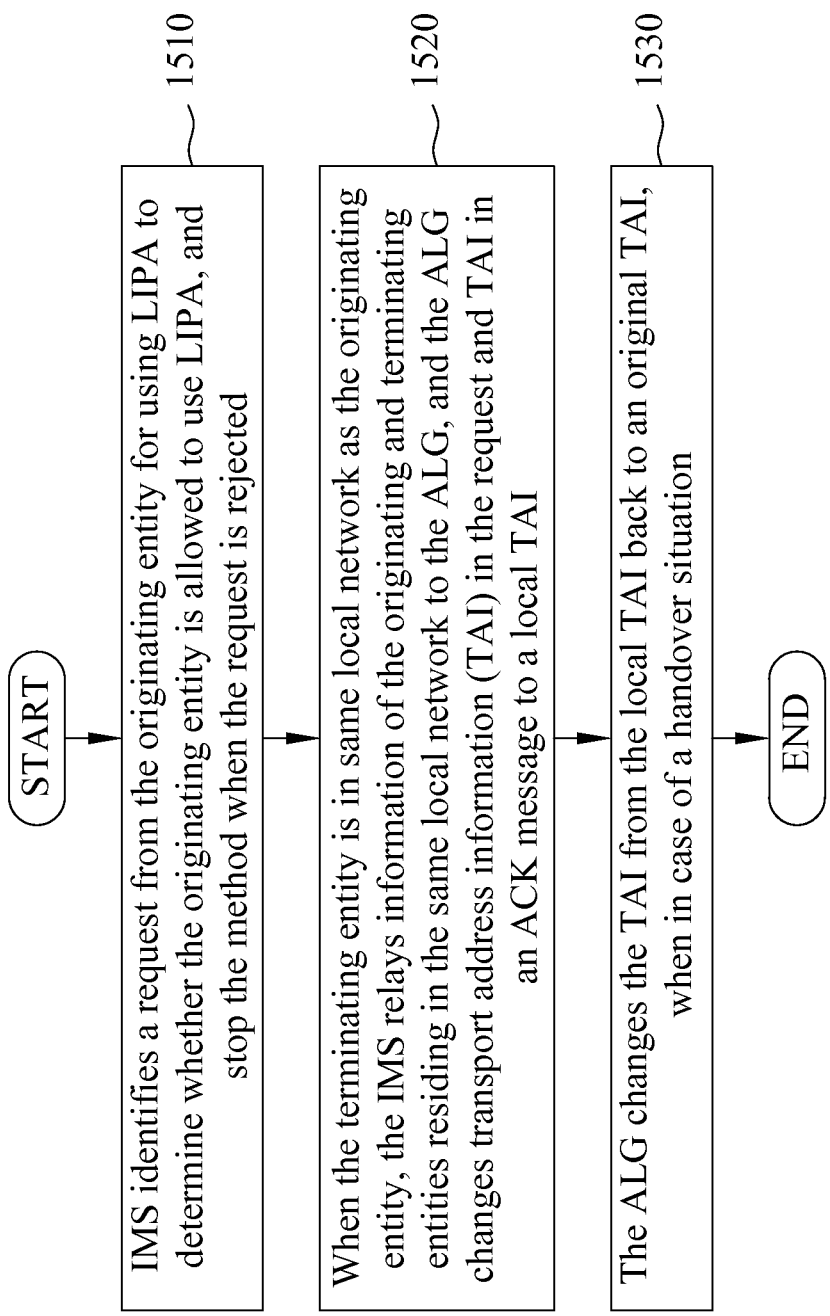
FIG. 15 shows a flowchart illustrating a method for ALG assisted LIPA at a Femto call base station by NAT, consistent with certain disclosed embodiments.

FIG. 15 shows a flowchart illustrating a method for ALG assisted LIPA at a Femto call base station by NAT, consistent with certain disclosed embodiments. Wherein, the method is applicable to an environment having an IP multimedia subsystem (IMS), an originating entity (UE), a terminating entity (UE), and a local network having an application server and a HeNB.

Referring to FIG. 15, IMS may identify a request from the originating entity as a request for using LIPA and determines whether the originating entity is allowed to use LIPA, and if not, stop the method, as shown in step 1510. When the terminating entity is in same local network as the originating entity, the IMS may relay information of the originating and terminating entities residing in the same local network to the ALG, and the ALG changes transport address information (TAI) in the request response and TAI in an ACK message to a local TAI, as shown in step 1520. In the case that the terminating entity is not in the same local network, depending on operator's policy, the IMS could now apply an announcement to e.g. inform the UE that the terminating entity is not in the same Local IP Network and regular charging applies or to request the UE to decide whether the call establishment should be continued or not.

The ALG may change the TAI from the local TAI back to an original TAI, when in case of a handover situation, as shown in step 1530. The original TAI may be assigned by a network operator or administrator.

Although the disclosure has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for application layer gateway (ALG) assisted local IP access (LIPA) at a base station by network address translation (NAT), applicable to a system having an IP multimedia subsystem (IMS), an originating entity, a terminating entity and a local network having an ALG and a Home eNode B (HeNB) having a NAT/Router/DHCP-Client module, said method comprising: said IMS identifying a request from said originating entity for using LIPA, facilitated by NAT, to determine whether said originating entity is allowed to use LIPA, and if not, stopping said method; when said terminating entity is in same local network as said originating entity, said IMS relaying that information of said originating and terminating entities residing in said same local network to said ALG, and said ALG changing transport address information (TAI) in said request response and TAI in an ACK message to a local TAI; when in case of a handover situation, said ALG changing the TAI from said local TAI back to an original TAI; and said IMS informing said originating entity that said terminating entity not being in the same local network and regular charging being applied or notifying to said originating entity to determine whether to proceed with a call setup when said terminating entity not residing in the same local network.

2. The method as claimed in claim 1, wherein when said terminating entity resides in a different local network and said originating entity decides to not continue said call setup, said IMS sends a CANCEL message to said terminating entity to end a session.

3. The method as claimed in claim 1, wherein transport address information containing in at least a message and at least a RTP/RTCP packet are proceeded with changes made by said ALG.

4. The method as claimed in claim 3, wherein said at least a message is based on a Session Initiation Protocol (SIP).

5. The method as claimed in claim 3, wherein said at least a message and said at least a RTP/RTCP packet are routed by said NAT/Router/DHCP-Client module, and said routing is based on said transport address information in said at least a RTP/RTCP packet.

6. The method as claimed in claim 3, wherein said routing is based on at least two port numbers.

7. The method as claimed in claim 6, wherein a first pool of at least two port numbers is reserved for said at least a message and a second pool of at least two port numbers is reserved for said at least a RTP/RTCP packet.

8. The method as claimed in claim 1, wherein said original transport address is assigned by a network operator or administrator.

9. The method as claimed in claim 1, wherein said IMS applies an announcement to said originating entity to inform it that the terminating entity is not in the same local network or to decide to proceed with the call setup or not, and to facility this with a SIP signaling.

10. A system for application layer gateway (ALG) assisted local IP access (LIPA) at a base station by network address translation (NAT), applicable to an environment having an IP multimedia subsystem (IMS), an originating entity, a terminating entity, and a local network having an application server and a Home eNode B (HeNB), said system comprising: an application layer gateway (ALG) integrated in said application server, responsible for changing transport address information (TM) in at least a signaling message and at least a packet from an IP address; and a NAT/Router/DHCP-Client module embedded in said HeNB for executing routing decision; wherein said IMS identifies a request from said originating entity for using LIPA, facilitated by NAT, to determine whether said originating entity is allowed to use LIPA, and if not, stops an associated method for application layer gateway (ALG) assisted local IP access (LIPA) at the base station by network address translation (NAT); wherein, when said terminating entity is in same local network as said originating entity, said IMS relays information of said originating and terminating entities residing in said same local network to said ALG, and said ALG changes transport TAI in a request from said originating entity for using LIPA and TAI in an ACK message to a local TAI, and when in case of a handover situation, said ALG changes the TAI from said local TAI back to an original TAI.

11. The system as claimed in claim 10, wherein said IP address is assigned by a network operator or administrator to a local IP transport address.

12. The system as claimed in claim 10, wherein said wherein said at least a signaling message is based on a Session Initiation Protocol (SIP).

13. The system as claimed in claim 12, wherein said SIP plays a role of a facilitator for LIPA.

14. The system as claimed in claim 10, wherein said routing decision is based on said transport address information in said at least a packet.

15. The system as claimed in claim 10, wherein said routing decision is based on at least two port numbers.

16. The system as claimed in claim 15, wherein a first pool of port number of said at least two port numbers is reserved for said at least a signaling messages and a second pool of said at least two port numbers is reserved for at least a RTP/RTCP packet.

* * * * *